Sept. 3, 1968  L. M. HOUGH, JR., ET AL  3,399,516
IMPREGNATED FIBER AIR FILTER AND METHOD OF MAKING SAME
Filed June 2, 1965  3 Sheets-Sheet 1
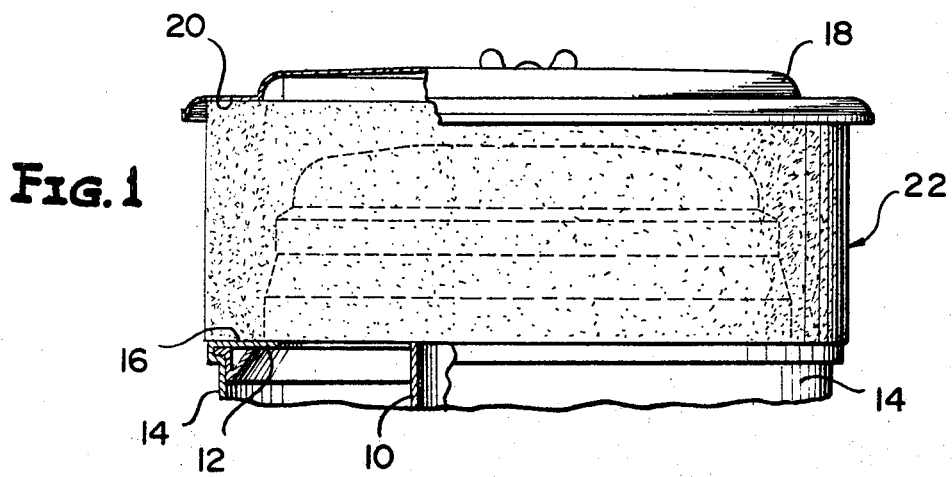
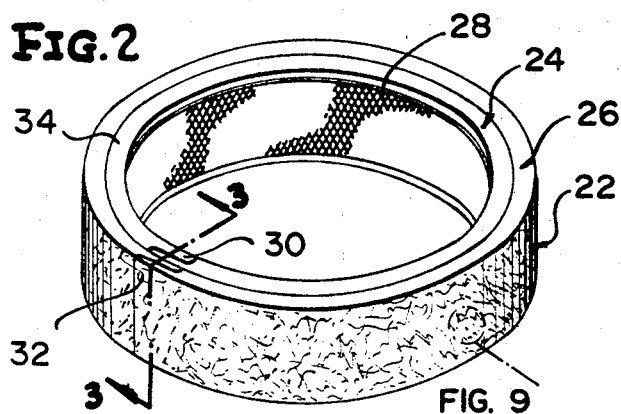
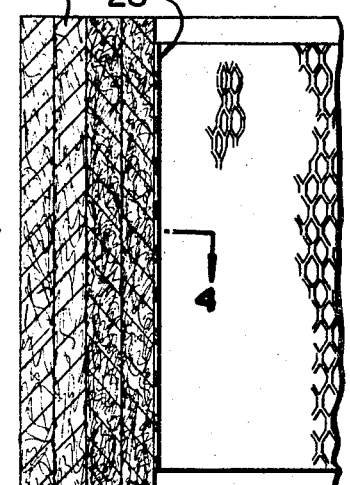
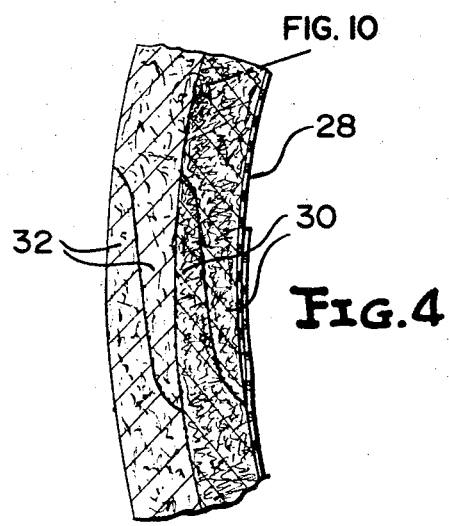
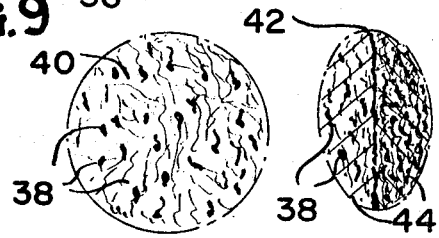
INVENTORS
LEWIS M. HOUGH, JR.
KINGSLEY E. HUMBERT, JR.
& JOHN R. HUFFSTETLER
BY *Shoemaker and Mattare*
ATTORNEYS Sept. 3, 1968     L. M. HOUGH, JR., ET AL     3,399,516
IMPREGNATED FIBER AIR FILTER AND METHOD OF MAKING SAME
Filed June 2, 1965     3 Sheets-Sheet 2

INVENTORS
LEWIS M. HOUGH, JR.
KINGSLEY E. HUMBERT, JR.
& JOHN R. HUFFSTETLER

By Shoemaker and Mattare

ATTORNEYS

Sept. 3, 1968   L. M. HOUGH, JR., ET AL   3,399,516
IMPREGNATED FIBER AIR FILTER AND METHOD OF MAKING SAME
Filed June 2, 1965   3 Sheets-Sheet 3
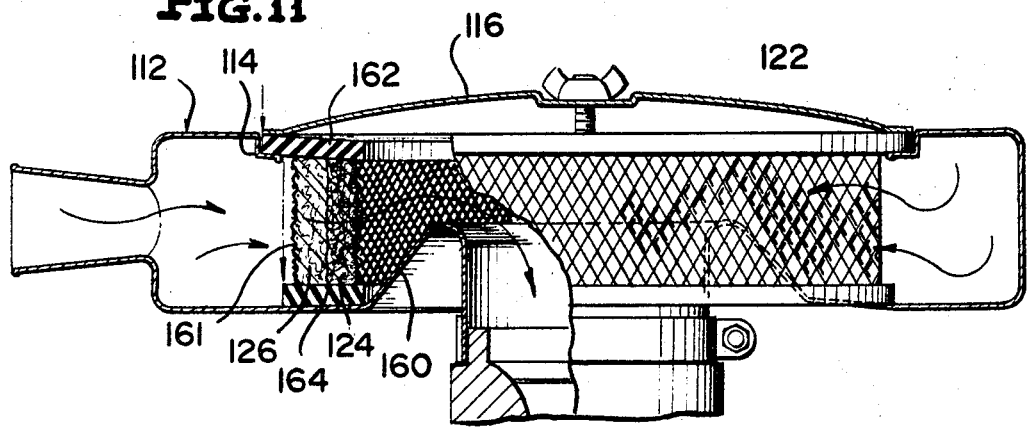
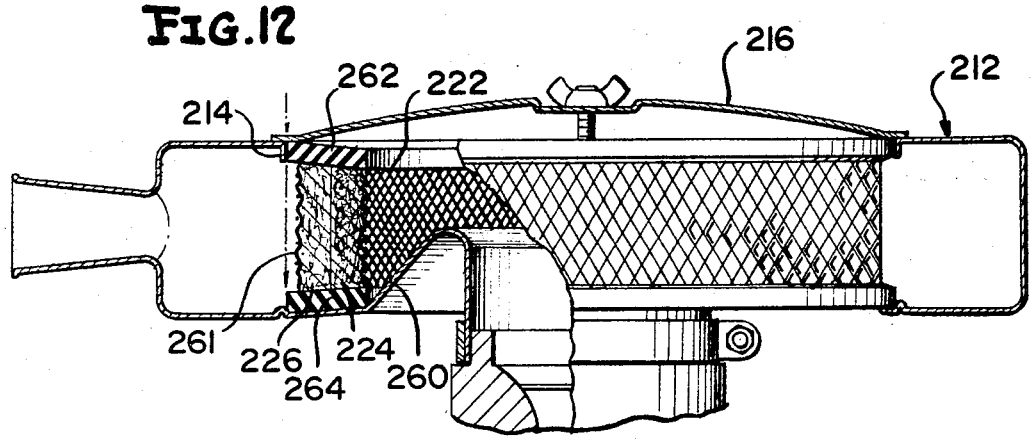
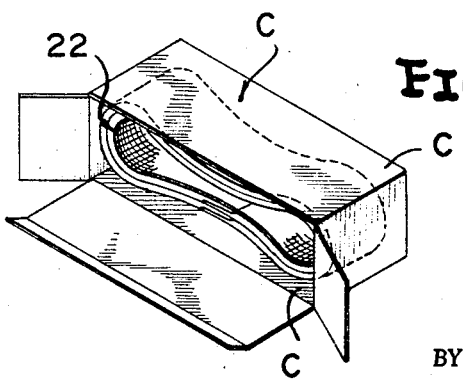
INVENTORS
LEWIS M. HOUGH, JR.
KINGSLEY E. HUMBERT, JR.
& JOHN R. HUFFSTETLER
BY *Shoemaker and Mattare*
ATTORNEYS United States Patent Office 3,399,516
Patented Sept. 3, 1968

3,399,516
IMPREGNATED FIBER AIR FILTER AND
METHOD OF MAKING SAME
Lewis M. Hough, Jr., Kingsley E. Humbert, Jr., and John R. Huffstetler, Gastonia, N.C., assignors to Wix Corporation, Gastonia, N.C., a corporation of North Carolina
Filed June 2, 1965, Ser. No. 460,656
3 Claims. (Cl. 55—487)

This invention relates generally to the class of filters and is directed particularly to improvements in air filters designed for use in association with motor vehicle carburetors for filtering the air passing to the carburetor. Use of the filter of the present invention is not restricted, however, to motor vehicle carburetors but may be used in other situations where applicable for the purpose of cleansing dust laden air.

The filter structure of the present invention is in the form of an annulus of the type which, as used in association with a motor vehicle carburetor, is mounted between annular metal surfaces in encircling relation with the tube leading to the vehicle carburetor, the top and bottom edges of the annular filter element cartridge having an air tight sealing engagement with the opposing surfaces between which the cartridge is positioned. The filters or filter cartridges of the form corresponding to the present invention, designed for use or installation in a suitable housing for operation in association with carburetors as heretofore constructed do not have the efficiency in removing airborne contaminants which is desirable for the most efficient operation of the carburetor and the engine in association with which it is employed. It is, accordingly, an important object of the present invention to provide a filter structure or filter cartridge of the type referred to wherein the efficiency in the terms of limiting or preventing the passage of airborne dust and other contaminants is approximately doubled as compared to the efficiency of other filter structures of corresponding dimensions, both of the paper type and fiber or batt type.

Another object of the invention is to provide an annular filter structure of non-woven porous material which while it is in batt or batting form, is of a new novel construction in the fiber material thereof.

Still another object of the invention is to provide a filter structure of the character stated embodying a batted structure of synthetic resin fibers impregnated with or bonded together by another synthetic resin cured thereon, whereby the batt assumes a relatively firm structure which will be maintained despite high pressure applied thereto by air passing therethrough.

Another object of the invention is to provide an annular or cylindrical air filter or cartridge structure composed of one or more layers of non-woven, porous material mounted on or disposed about a free flowing support member and wherein the porous material is of a treated fibrous character having such body stiffness as to permit opposite edges thereof to be effectively sealingly pressed against opposite surfaces of the metal housing in which the filter structure is mounted for use.

A still further object of the invention is to provide an annular or cylindrical filter structure of the character stated wherein layers of filter material are bonded together to form a structurally integral gradiently stepped density.

Still another object of the invention is to provide a filter structure of the character stated formed of non-woven porous fiber material which may be synthetic resin, glass, wire and other suitable filaments matted and bonded together to form a highly porous structure and impregnated with a flame proofing liquid which may be an oil or other suitable liquid of a flame proofing character, to prevent burning of the filter structure in event of backfire through the carburetor.

Still another object of the invention is to provide a filter structure of cylindrical form which has in one embodiment a construction which permits the folding of the structure whereby the same may be encased in an elongate carton to facilitate handling and storage but will assume its normal circular or cylindrical form upon being removed from the carton for use.

The invention will be best understood from a consideration of the following detailed description taken in connection with the accompanying drawings wherein:

FIGURE 1 is a view partly in side elevation and partly in section of a conventional type of air filter housing and showing therein a portion of a filter, in side elevation, constructed in accordance with the present invention.

FIGURE 2 is a perspective view of the filter cartridge.

FIGURE 3 is a sectional view, on an enlarged scale, taken substantially on line 3—3 of FIGURE 2.

FIGURE 4 is a sectional view taken substantially on the line 4—4 of FIGURE 3.

FIGURE 9 shows a small outer surface area of the filter material on a greatly enlarged scale to illustrate the joining together of the filaments on and adjacent to the surface by an impregnating or bonding material or adhesive such as vinyl resin, the indicated area or surface being designated "FIG. 9" in FIGURE 2.

FIGURE 10 shows a similarly magnified portion of the structure at the abutting surfaces of the two batt layers of FIGURE 4, the magnified area or portion being designated "FIG. 10" in FIGURE 4.

FIGURE 11 is a cross sectional view of a conventional type of air filter housing illustrating, partly in section, a filter cartridge structure designed for use therein and embodying two layers of batt material positioned between inner and outer annular foraminous supporting or reinforcing bands.

FIGURE 12 is a cross sectional view of another type of conventional filter housing illustrating therein and partly in section a filter cartridge structure, in accordance with the present invention and corresponding to the structure shown in FIGURE 11.

FIGURE 14 illustrates a novel method of packaging a filter cartridge constructed in accordance with an embodiment of the present invention.

Figure 5:
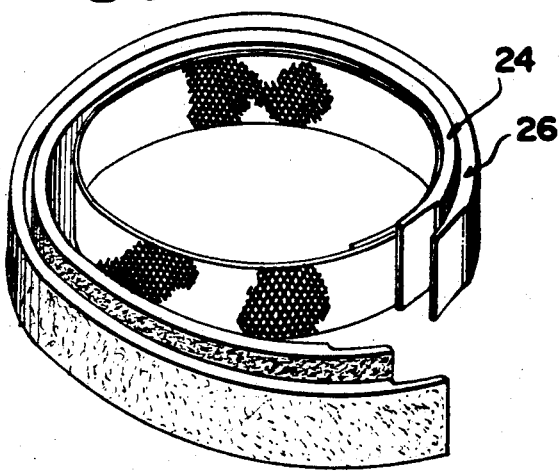
FIGURE 5 is a perspective view illustrating the laminations of filter material in opened out condition and in encircling relation with an inner foraminous support body.

Referring now more particularly to the drawings, FIGURE 1 illustrates, partly in side elevation, and partly in section, a conventional shell or housing structure for a replaceable annular or cylindrical filter cartridge constructed in accordance with an embodiment of the present invention. This shell or housing structure comprises the air intake pipe or conduit 10, an inner shell body 12, a portion only of which is here illustrated and which is connected to or forms a part of the supporting casing 14.

The body 12 has an upwardly facing annular shoulder 16 between which and the casing top or cap 18, the annular filter cartridge element is mounted and secured.

The cap or housing cover has a downwardly facing filter element engaging, annular surface 20 which lies directly above and in spaced opposed relation with the lower supporting surface 16. These parts of the filter housing are conventional and well known.

The annular filter cartridge of the present invention, in one embodiment thereof, is shown mounted in operative position in the shell or housing and is generally designated 22.

The filter structure 22 is here illustrated as comprising two bands or strips of material designated 24 and 26. These bands of material are of different densities, the inner band 24 being a more closely formed or denser construction than the outer band 26.

While the preferred construction is a two layer structure, or more, it is also contemplated that a single layer or single thickness band of material may be formed in accordance with the present invention wherein the fibers of which the layer or band is composed may be impregnated with and have cured thereon in the surface adjacent areas thereof, a synthetic resin to have a structure like the illustrated outer layer or band 26.

The batted fibrous material in a single band or in the concentric bands or layers illustrated in FIGURES 1 to 5, is laid on and around an annular, foraminous reinforcing band 28. This band is here illustrated as being in the form of expanded metal or it may comprise a sheet metal having circular perforations formed therein, or of any suitable relatively stiff material which will freely pass air or other gas therethrough.

As is clearly illustrated in FIGURES 2, 4 and 5, the strips of fibrous material forming the annular bands of the structure have skived or beveled ends as indicated at 30 for the inner band 24 and at 32 for the outer band 26, whereby the ends of the bands may be brought together in overlapping relation and maintain their thickness or have the same thickness throughout, as will be readily apparent.

As shown in FIGURE 3, the width of the filter body in the fibrous portion thereof, that is, the width of the bands encircling the foraminous reinforcement 28, is slightly greater than the width of the reinforcement, which permits a slight compression in the axial direction of the filter, between the housing surfaces 16 and 20, which the top and bottom end surfaces of the fibrous material contact.

The batted material making up the air pervious body of the filter is a mono-filament fiber preferably of the synthetic resin nylon, but it may also be any other suitable resin. The fibers are massed together in suitable degrees of thickness depending upon the density desired for the filter.

In the two layer structure here illustrated the inner layer or band 24 may be of a more dense character than the outer layer 26, that is, the fibers of the inner layer may be somewhat more closely massed or matted together than the fibers of the outer layer.

The batted fibrous material of the filter layers, is also impregnated with a vinyl resin, such as polyvinyl chloride, for example, or other suitable resin, which is secured on the fibers of nylon or other synthetic resin material after the strips or bands of material have been placed around or mounted on the supporting foraminous band 28.

The impregnation of the batted fibrous material or the mass of fiber forming the strip, band or layer is carried out by spraying the vinyl resin on the surface or surfaces of the layer of material whereby the resin penetrates to a slight degree or slight extent into the batt. Fibers near the surfaces of the batt may then become coated or partially coated with the resin adhering particularly to contacting portions of the fibers where the individual fibers cross one another.

The completed filter structure, that is, the completely assembled structure, is held between opposing surfaces of a suitable form during the operation of curing the vinyl resin with which the base fibers are coated and this results in the top and bottom edge surfaces assuming a flat, relatively firm form. Such top and bottom flat, relatively firm surfaces are designated 34 and 36, respectively. Thus, it will be seen that when the filter is placed in the housing as shown in FIGURE 1, the top and bottom edge surfaces of the filter will have the opposing surfaces 20 and 16, respectively, pressed firmly thereagainst to establish an air seal.

In the operation of heat curing the vinyl resin applied to the fibers joins the fibers together as indicated at 38 in FIGURES 9 and 10 where the numeral 40 designates the individual fibers.

The applied vinyl resin bonds the fibers together where the inner and outer layers of material are in contact as indicated at 42 in FIGURE 10. In this figure the fibers 44 of the inner layer are shown somewhat more closely packed than the fibers 38 of the outer layer and the vinyl resin impregnating the layer fibers or surface adjacent fibers, in the curing operation, also bonds the fibers of the inner layer to the foraminous supporting band 28.

The vinyl chloride resin applied to the surfaces of the batt layers and penetrating part way into the mass of fibers and coating the fibers only to the extent of the penetration, when cured maintains the fibers in the batting form.

It will be seen also that in the operation of curing the vinyl resin coating of the base fibers, the overlapped ends of the bands or layers of material will also be tightly joined or bonded together.

Figure 6:
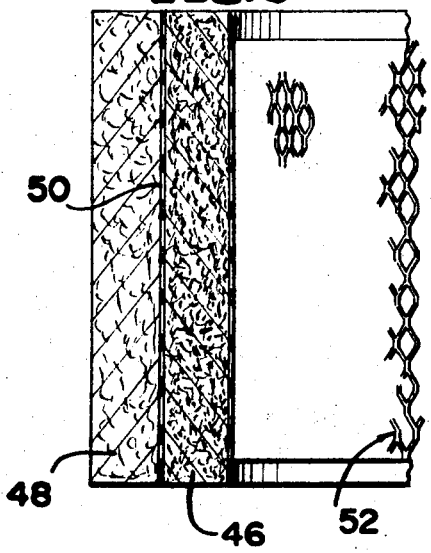
FIGURE 6 is a sectional view on an enlarged scale corresponding to FIGURE 3 but taken through the full thicknesses of the two laminations and showing the foraminous reinforcement between the layers and on the inside also of the structure.

FIGURE 6 illustrates, in longitudinal section, a portion of a two layer or two band filter structure wherein the inner and outer layers or bands 46 and 48, respectively, have the foraminous reinforcing support interposed between the layers as indicated at 50. The fibrous layers of material in this structure may be the same as described in connection with the structure shown in FIGURE 2 and while there is also shown an inner reinforcing foraminous band 52, corresponding to the band 28, this may be omitted if desired.

Figure 7:
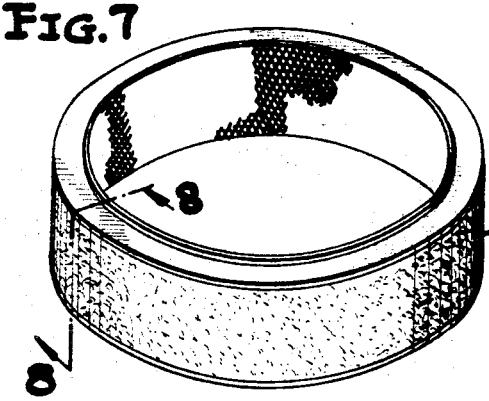
FIGURE 7 is a view in perspective of the filter structure corresponding to FIGURE 2 but showing the addition of molded vinyl sealing gaskets over the top and bottom end edges thereof.
Figure 8:
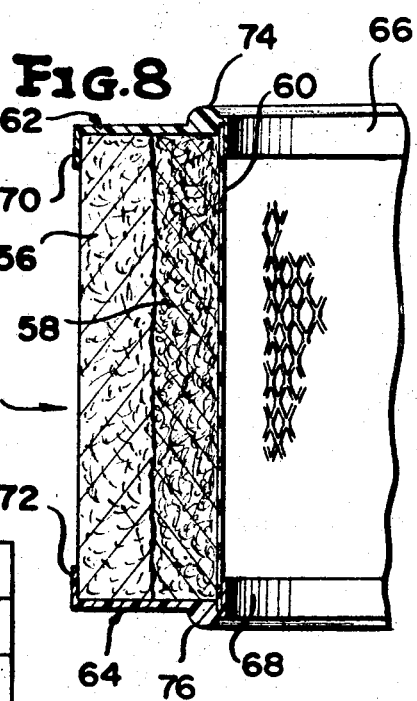
FIGURE 8 is a sectional view, on an enlarged scale, taken substantially on the line 8—8 of FIGURE 7.

As hereinbefore stated, the vinyl resin coating of the basic fibers, that is, the fibers forming the mass of the batt strips 24 and 26 when cured in a heated mold, will provide a relatively firm or stiff surface at the top and bottom ends of the filter body and such surfaces at the ends of the filter body when pressed firmly against the surfaces 16 and 20 of the housing, will form a tight seal which will effectively prevent air from bypassing the filter structure. However, if desired, the top and bottom ends of the filter structure may have vinyl sealing gaskets molded thereover as illustrated in FIGURES 7, 8, 11 and 12. In FIGURES 7 and 8 the filter structure as a whole is designated 54 and as illustrated in the sectional view forming FIGURE 8 it may be constructed in two layers such as are designated 56 and 58 disposed on and around a foraminous stiffening sleeve or band 60. However, as will be readily obvious the structure is not necessarily restricted to a two layer arrangement but may consist of a single layer of the batted material or it may have more than two layers which could be of different degrees of density as desired.

It will be understood, of course, that the same monofilament fibers of nylon or other suitable resin will make up the batt in which the fibers are in part coated with the vinyl resin which is cured on the fibers to give the structure hereinbefore described.

The gaskets upon the ends of the filter structure shown in FIGURES 7 and 8 are designated 62 and 64 and as shown these when molded on the ends of the filter material would be formed at the inside of the annulus to extend into and be bonded to the foraminous supporting band 60 as indicated at 66 and 68 and at the outer side of the annulus a lip would be molded down over the outer surface of the outer layer of the coated fiber filaments as indicated at 70 and 72.

There may also be formed upon each of the gaskets, adjacent to the inner edge thereof, a rib to be compressed between the surfaces 16 and 20 of the housing, such ribs being designated 74 and 76 for the top and bottom edges of the structure, respectively.

While the gaskets 62 and 64 have been illustrated as extending over the full radial thickness of the filter material they may be formed, if desired, of a width to extend outwardly from the foraminous support 60, approximately half the thickness of the structure.

It is also a feature of the invention to form the vinyl sealing gaskets 62 and 64 of a transparent material whereby the character of the fibrous filter structure can be readily seen together with the manner in which the batting layers, when two or more layers are provided, are bonded together.

In the constructions where the vinyl ends are employed the gluing or adhesion of the confronting or contacting surfaces of the bands together would not be employed. In these structures only the opposing surfaces of the overlapping ends would be secured together by the vinyl resin or other suitable adhesive material.

In FIGURE 11 the numeral 122 generally designates a filter cartridge construction embodying two layers of batted material, designated 124 and 126 and corresponding to the hereinbefore described layers or batt strips 24 and 26. Each of these layers or strips of fibrous material such as the synthetic resin fibers hereinbefore referred to, has overlapped and adhesively secured together skived end portions corresponding to the structure shown in FIGURE 4 so that the thickness of each layer or strip is uniform throughout.

The inner and outer sides of the fiber body, made up of the batts 124 and 126, are reinforced by the annular foraminous bands 160 and 161. These provide the necessary support for the fiber structure and in this structure the impregnating vinyl resin is applied to the fibers at the surfaces of the batt layers which abut the foraminous supporting structures 160 and 161.

No adhesive or other bonding material is used or is necessary between the confronting and contacting surfaces of the layers 124 and 126 in this construction.

The numerals 162 and 164 designate top and bottom vinyl sealing gaskets in which the top and bottom edges of the formainous annular reinforcements 160 and 161 are embedded.

In the filter construction shown in FIGURE 11 the gaskets are designed to adapt the filter to a standard type of housing such as is here illustrated.

The filter housing of FIGURE 11 is generally designated 112, the top wall of which is provided with an opening defined by a depressed or inset shoulder or ledge 114 while the bottom wall of the housing presents a flat supporting surface. The lower gasket 164 rests directly upon the flat surface of the bottom wall of the housing while the upper gasket 162 is of larger diameter than the lower gasket whereby the outer peripheral portion of the upper gasket rests upon the ledge 114 and is pressed down onto the ledge by the housing cover or cap 116 as illustrated.

The overall diameter of the gasket 164 is less than the diameter of the opening defined by the ledge 114 whereby the lower gasket can be readily introduced into the housing while the overall diameter of the cover 116 approximates that of the top gasket 162 so that the periphery of the cover can be drawn down tightly against the top gasket without engaging the top wall of the housing.

In FIGURE 12 the filter structure which is generally designated 222 may be of the same construction in the fibrous batt material, the layers of which are designated 224 and 226, and in the foraminous inner and outer reinforcing bands 260 and 261. However, the top and bottom vinyl gaskets 262 and 264 are of approximately the same overall or outside diameter to facilitate the placement of the filter cartridge in a housing of the form or construction illustrated. In this housing which is generally designated 212 the top wall opening is defined by a straight down turned flange 214 and the interior diameter of this flange approximates the outside diameter of the top gasket 262 whereby when the cartridge is introduced into the housing, the bottom gasket will pass down without hindrance and placed to rest upon the bottom wall of the housing and the outer edge or periphery of the top gasket 262 will lie within the flange 214 substantially in contact therewith.

The housing cover 216, in this housing construction rests upon the top wall of the housing and overlies the joint between the flange and the periphery of the gasket 262.

The material of the filter in the different forms shown and described is treated with a suitable flame proofing oil or similar substance to aid filtration and also to prevent the filter from burning in the event of a backfire through the carburetor air pipe. Such flame proofing material may be a solution of tri-cresyl phosphate or any of the family of cresyl phosphates or phosphate esters or water soluble oil saturates with flame retardent salts may be employed.

To coat the fibers of the flame proofing oil or other substance, the filter structure is immersed in the solution and then spun to remove the excess thereof whereby to leave the fibers coated with the flame proofing material.

Actual tests of filters made in accordance with the present invention have demonstrated that such filter will pick up or trap approximately twice as much dust as a paper type filter will do and the batting type filter of the present invention will also maintain a higher efficiency in the operation.

Figure 13:
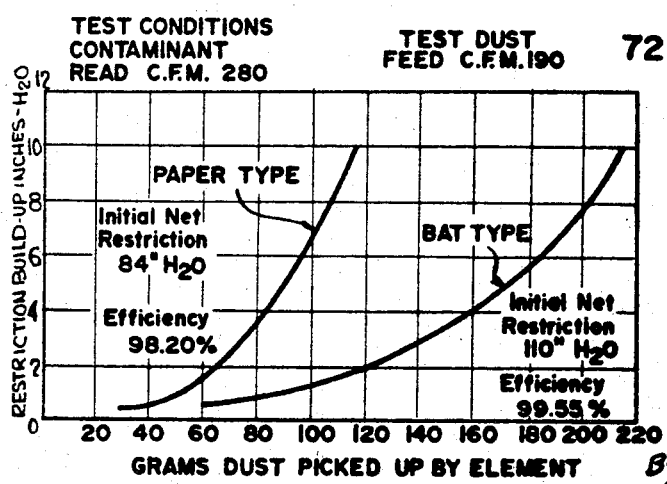
FIGURE 13 is a graph illustrating the high efficiency of the present oil treated batting type filter structure as compared with a conventional pleated paper dry type air filter.

FIGURE 13 illustrates the comparative efficiency of the paper type filter and the batt type filter of the present invention. It is pointed out in connection with the graph forming this figure that while the efficiency figures appear to be relatively close, the real measure of an air cleaner is its inefficiency. From this standpoint, it will be seen that the paper type filter had an inefficiency of 1.2 percent which would have resulted in approximately 1.4 grams of dust passing the cleaner while 116 grams were prevented from passing. At the same restriction build-up level (10 inches of water) the batting type air cleaner element of the present invention had permitted approximately .97 gram of dust to pass, while preventing the passage of 216 grams. This illustrates that with the air cleaners operated side by side under the same conditions in a given period of time, the paper type would allow approximately three times as much dust to pass as would the treated batting type of the present invention.

The data shown in FIGURE 13 was obtained from a nylon batting produced on a Rando-Webber machine. This is a card type machine.

This batting was sprayed on both surfaces with a vinyl chloride resin. The resin was then cured only enough to maintain the fibers and resin in the batting form.

The air filters illustrated in the several figures were then fabricated and the fabricated filters were subjected to the curing of the vinyl chloride.

As above set forth the coating of the fibers with the selected moist flame proofing material or substance is effected my introducing the entire structure into the flame proofing material until the fiber body is completely saturated. After saturating the body the same was removed and centrifuged about its own axis to remove excess material and leave a coating of the flame proofing material on all the fibers and cured resin surfaces.

In the form of the filter illustrated in FIGURES 1 to 5 inclusive where only an inner supporting foraminous sleeve is employed, this foraminous material may be heat treated metal or spring steel. By so forming the inner foraminous material the filter may be compressed radially or flattened to about ½ of its diameter as illustrated in FIGURE 14. This then makes possible the use of a rectangular carton such as that illustrated and generally designated C in which the flattened or compressed filter cartridge may be replaced for merchandising. Thus it will be seen that the space required for packing, shipping and storing the cartridge units will be materially less than that required where the cartons or boxes for the filter units are of the usual square formation.

It will, of course, be apparent that when the normally circular or cylindrical filter has been compressed or flattened to the elongate form shown in FIGURE 14 and then placed within an elongate rectangular carton it will be held in this flattened condition by the side walls c of the carton but when it is removed the normally resilient and foraminous inside support or reinforcement will return to its initial circular form and the filter will be then ready for placement directly into its housing.

From the foregoing, it would be apparent that there is provided by the present invention an improved batting type filter having a much higher efficiency than paper type air filters such as are conventionally used in the same situations in which the filter of the present invention is designed to be used.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. An air filter cartridge comprising an annular band of two concentrically disposed rings having mating surfaces, said rings being axially compressible, each ring being composed of randomly disposed synthetic filaments and being of the same height and radial thickness, the inner ring having more filaments therein and being closely compacted and of a more dense character than the outer ring, the rings being impregnated with a liquid resin throughout and on all surfaces thereof bonding the filaments and the mating surfaces together thus making a rigid structure and providing closed end flat faces, a foraminous rigid tube engaging and being bonded to the inner surface of the inner ring and being of less height than the band, each band having end portions, the end portions being complementarily skived so that when joined the end portions will be of the same thickness as the remainder of the ring, the entire band being impregnated with a fireproofing compound and the closed end faces comprising a gasket to engage a housing structure and with the rigid inner tube allowing compression of the band, seals the band in the housing.

2. The air filter cartridge as set forth in claim 1 wherein the concentric rings have a rigid foraminous tube between the mating surfaces, the tube being of less height than the rings, the liquid resin bonding the mating surfaces of the rings together through the foraminations of the tube.

3. The method of forming an air filter cartridge comprising forming a first batt of randomly disposed synthetic filaments, forming a second batt of randomly disposed synthetic filaments of more filaments than the first batt and of a denser characteristic, each batt being formed of a similar thickness and height, skiving the end portions of each batt, impregnating all surfaces of the batts, forming the batts into rings joining the skived end portions, placing the ring made from the second batt concentrically within the ring of the first batt with the maing surfaces of each ring being in contact with each other, curing the concentrically disposed rings to set the impregnating resin so as to join the contiguous portions of the filaments together and to join the mating surfaces of the two concentric rings and to produce closed surfaces on the opposed end faces, taking a foraminous sheet of substantially the internal diameter of the inner batt but of less height, forming the foraminous sheet into ring shape and placing the ring within the inner surface of the thus formed band and engaging the inner surface of the inner batt placing the entire structure within a housing with the closed end surfaces forming a gasket thus sealing the structure withing the housing.

References Cited

UNITED STATES PATENTS

| | | | |
|---|---|---|---|
| 2,132,958 | 10/1938 | Martin | 206—46 |
| 2,521,984 | 9/1950 | Lang | 55—486 |
| 2,888,095 | 5/1959 | Perrini et al. | 55—487 |
| 3,058,468 | 10/1962 | Allan | 206—46 |
| 2,330,251 | 9/1943 | Taylor et al. | 117—136 |
| 2,476,582 | 7/1949 | Browne et al. | |
| 2,539,768 | 1/1951 | Anderson | 210—496 X |
| 2,732,031 | 1/1956 | Rabbitt et al. | 55—502 |
| 2,966,960 | 1/1961 | Rochlin. | |
| 3,026,609 | 3/1962 | Bryan | 210—496 |
| 3,133,884 | 5/1964 | Graham et al. | 55—524 |
| 3,137,589 | 6/1964 | Reinhard et al. | 117—140 |

FOREIGN PATENTS 909,894  11/1962  Great Britain.

HARRY B. THORNTON, *Primary Examiner.*

B. NOZICK, *Assistant Examiner.*